(12) United States Patent
Hamm

(10) Patent No.: US 10,296,085 B2
(45) Date of Patent: May 21, 2019

(54) RELATIVELY SIMPLE AND INEXPENSIVE FINGER OPERATED CONTROL DEVICE INCLUDING PIEZOELECTRIC SENSORS FOR GESTURE INPUT, AND METHOD THEREOF

(71) Applicant: Markantus AG, Taegerwilen (CH)

(72) Inventor: Dirk Hamm, Taegerwilen (CH)

(73) Assignee: Markantus AG, Taegerwilen (CH)

( * ) Notice: Subject to any disclaimer, the term of this patent is extended or adjusted under 35 U.S.C. 154(b) by 0 days.

(21) Appl. No.: 14/638,226

(22) Filed: Mar. 4, 2015

(65) Prior Publication Data
US 2015/0277558 A1    Oct. 1, 2015

(30) Foreign Application Priority Data
Mar. 5, 2014   (EP) ..................... 14157839

(51) Int. Cl.
*G06F 3/0487*    (2013.01)
*G06F 3/01*    (2006.01)

(52) U.S. Cl.
CPC .............. *G06F 3/014* (2013.01); *G06F 3/013* (2013.01); *G06F 3/0487* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS 4,250,894 A * 2/1981 Frei ...................... A61B 5/0051
600/382
4,988,981 A   1/1991 Zimmerman et al.
(Continued)

FOREIGN PATENT DOCUMENTS

CA   2 773 900 A1   10/2012
CN      2632757 Y    8/2004
(Continued)

OTHER PUBLICATIONS

Dargahi et al., "A supported membrane type sensor for medical tactile mapping", Sensor Review, vol. 24 Iss: 3, 2004, pp. 284-297.
(Continued)

*Primary Examiner* — Chanh D Nguyen
*Assistant Examiner* — Karin Kiyabu
(74) *Attorney, Agent, or Firm* — Muirhead and Saturnelli, LLC

(57) ABSTRACT

A finger operated control device includes at least one finger portion that covers at least 30% of a surface area of skin around a distal phalanx of a finger and piezoelectric sensors coupled to the finger portion and having a plurality of electrodes, where at least two of the electrodes are separated by a material with piezoelectric properties. The at least one finger portion may be thimble shaped and may be made of polymer. The at least one finger portion may be a piezoelectric polymer or polyvinylidene fluoride. A distance between at least 50% of the electrodes may be between 0.1 and 5 mm or between 0.5 and 2 mm. A number of electrodes may be between 5 and 2000 or between 20 and 200. The finger operated control device may also include a computing device coupled to the finger portion using at least a wireless and/or wired connection.

22 Claims, 2 Drawing Sheets

(56) References Cited

U.S. PATENT DOCUMENTS

| | | | | |
|---|---|---|---|---|
| 5,013,874 | A * | 5/1991 | de Bruyne | G06F 3/0202 |
| | | | | 178/18.03 |
| 5,290,964 | A * | 3/1994 | Hiyoshi | G06F 3/014 |
| | | | | 84/600 |
| 6,037,703 | A * | 3/2000 | Kambe | G01L 1/16 |
| | | | | 29/25.35 |
| 6,094,188 | A | 7/2000 | Horton et al. | |
| 6,424,334 | B1 | 7/2002 | Zimmerman et al. | |
| 6,452,584 | B1 | 9/2002 | Walker et al. | |
| 6,452,585 | B1 | 9/2002 | Horton et al. | |
| 7,842,879 | B1 * | 11/2010 | Carter | G10H 3/143 |
| | | | | 84/600 |
| 8,211,026 | B2 * | 7/2012 | Schutz | A61B 5/6826 |
| | | | | 600/437 |
| 2002/0130673 | A1 * | 9/2002 | Pelrine | A63H 3/365 |
| | | | | 324/727 |
| 2003/0026170 | A1 * | 2/2003 | Yang | G04C 3/005 |
| | | | | 368/10 |
| 2003/0048312 | A1 | 3/2003 | Zimmerman et al. | |
| 2003/0214481 | A1 | 11/2003 | Xiong | |
| 2005/0145045 | A1 * | 7/2005 | Papakostas | G01L 1/20 |
| | | | | 73/864 |
| 2005/0268699 | A1 * | 12/2005 | Papakostas | G01L 1/20 |
| | | | | 73/46 |
| 2006/0094989 | A1 * | 5/2006 | Scott | A61F 2/54 |
| | | | | 601/5 |
| 2006/0119578 | A1 | 6/2006 | Kesavadas et al. | |
| 2009/0212979 | A1 * | 8/2009 | Catchings | G06F 3/014 |
| | | | | 341/20 |
| 2009/0326833 | A1 * | 12/2009 | Ryhanen | G06N 3/0675 |
| | | | | 702/33 |
| 2010/0013758 | A1 | 1/2010 | Biswas et al. | |
| 2010/0109595 | A1 * | 5/2010 | Tan | H01L 41/042 |
| | | | | 318/652 |
| 2010/0110025 | A1 | 5/2010 | Lim | |
| 2010/0259472 | A1 * | 10/2010 | Radivojevic | G06F 3/014 |
| | | | | 345/156 |
| 2011/0007000 | A1 | 1/2011 | Lim | |
| 2012/0016604 | A1 | 1/2012 | Irving et al. | |
| 2012/0204322 | A1 * | 8/2012 | Fukushima | D01D 5/247 |
| | | | | 2/167 |
| 2012/0262369 | A1 * | 10/2012 | Griffin | G06F 3/014 |
| | | | | 345/157 |
| 2013/0169420 | A1 * | 7/2013 | Blount, Jr. | G06F 3/014 |
| | | | | 340/12.5 |
| 2013/0249786 | A1 | 9/2013 | Wang | |
| 2014/0214285 | A1 * | 7/2014 | Wesling | F16H 59/02 |
| | | | | 701/51 |
| 2014/0215684 | A1 * | 8/2014 | Hardy | A41D 19/0031 |
| | | | | 2/160 |
| 2015/0019013 | A1 * | 1/2015 | Rose | G01L 1/16 |
| | | | | 700/258 |
| 2016/0004416 | A1 * | 1/2016 | Kim | H04M 1/72563 |
| | | | | 715/769 |
| 2016/0274662 | A1 * | 9/2016 | Rimon | G06F 3/014 |
| 2017/0168565 | A1 * | 6/2017 | Cohen | B25J 13/025 |

FOREIGN PATENT DOCUMENTS

| | | |
|---|---|---|
| CN | 201332447 Y | 10/2009 |
| CN | 101751126 A | 6/2010 |
| CN | 102053702 A | 5/2011 |
| CN | 201870054 U | 6/2011 |
| CN | 202179154 U | 4/2012 |
| CN | 202677304 U | 1/2013 |
| CN | 103034344 A | 4/2013 |
| CN | 103226398 A | 7/2013 |
| CN | 203038229 U | 7/2013 |
| CN | 103345064 A | 10/2013 |
| DE | 35 86 204 T2 | 12/1992 |
| DE | 42 40 531 C1 | 2/1994 |
| EA | 004128 B1 | 12/2001 |
| EP | 0 211 984 B1 | 6/1992 |
| EP | 1 340 218 | 9/2003 |
| EP | 1 181 679 A1 | 2/2007 |
| IN | 1980/DEL/2011 A | 8/2011 |
| JP | 8-161106 | 6/1996 |
| JP | 2002203996 A * | 7/2002 |
| JP | 2003284697 A * | 10/2003 |
| JP | 2006-330136 A | 12/2006 |
| KR | 1996-0024848 | 7/1996 |
| KR | 10 2000 0032308 A | 6/2000 |
| KR | 2000-0032308 | 6/2000 |
| KR | 1020000032308 A1 | 12/2001 |
| TW | 273908 B | 4/1996 |
| TW | 476643 B | 2/2002 |
| WO | WO 92/09983 | 6/1992 |
| WO | WO 98/50839 | 11/1998 |
| WO | WO 00/35091 | 6/2000 |
| WO | WO 01/59741 A1 | 8/2001 |
| WO | WO 02/37466 A1 | 5/2002 |
| WO | WO 2009/144363 A1 | 12/2009 |
| WO | WO 2010/147704 A9 | 12/2010 |
| WO | WO 2011/143661 A2 | 11/2011 |

OTHER PUBLICATIONS

Extended European search report for Applic. No. 14157839.3-1959, dated Jun. 17, 2014, 8 pages.

Tekscan: "Feb. 24, 2006 I-Scan User Manual (Rev H) I FlexiForce Sensors User Manual", Dec. 29, 2010, XP055226770, retrieved from https://www.tekscan.com/sites/default/files/FLX-FlexiForce-Sensors-Manual.pdf on Nov. 9, 2015.

Communication pursuant to Article 94(3) EPC for Applic. No. 14157839.3-1959, dated Nov. 20, 2015, 9 pages.

* cited by examiner

RELATIVELY SIMPLE AND INEXPENSIVE FINGER OPERATED CONTROL DEVICE INCLUDING PIEZOELECTRIC SENSORS FOR GESTURE INPUT, AND METHOD THEREOF

TECHNICAL FIELD

The invention relates to control devices and more particularly to finger operated control devices.

BACKGROUND OF THE INVENTION

It is relatively difficult and expensive to control computing devices by capturing the movement of fingers. Some documents of the prior art teach the integration of complicated and expensive sensors into gloves. CN 101751126 A describes a sensor worn on a finger. US 20030214481 A1 also describes a sensor worn on a finger. DE 4240531 C1 describes a glove for controlling a computer. KR 1020000032308 A describes the generation of computer commands executed by the movement of a glove. Dargahi et al. (Javad Dargahi, Siamak Najarian, (2004) "A supported membrane type sensor for medical tactile mapping", Sensor Review, Vol. 24 Iss: 3, pp. 284-297) describe medical sensors using the piezoelectric effect.

It is desirable to provide a relatively simple and inexpensive mechanism to capture complex movements of the fingers such as dragging the fingers over a surface.

SUMMARY OF THE INVENTION

The system described herein provides a control device that includes a finger portion that covers at least 30% of the surface area of the skin around the distal phalanx of a finger. The finger portion includes piezoelectric sensors having a plurality of electrodes, where at least two electrodes are separated by a material with piezoelectric properties.

The system described herein has an advantage that no external touch sensors are needed to operate the system. The fingertip may simultaneously be a sensor and a pointing device.

Electrodes of the piezoelectric sensors capture the pressure acting onto the sensors. Also, with materials available today, the system described herein is relatively inexpensive and easy to implement. For example, the system may be provided by a whole array of electrodes of the piezoelectric sensors. The piezoelectric sensors having a plurality of electrodes facilitates detection of dragging of a finger over a surface by monitoring the change of electric potential of neighbouring electrodes of the piezoelectric sensors.

The finger portion may have a shape of a thimble and may be made of polymer, where the finger portion may include piezoelectric polymer, and where the finger portion may include polyvinylidene fluoride. The wall of the finger portion may be the piezoelectric polymer, thus forming a polymer wall of the finger portion. The polymer may be amorphous and may be present in the shape of a foil.

A distance between two or more of the electrodes (and in some cases, at least 50% of the electrodes) of the piezoelectric sensors may be in a range between 0.1 to 5 mm, and possibly in a range between 0.5 and 2 mm. A number of electrodes of the piezoelectric sensors may be in a range between 5 and 2000, and possibly in a range between 20 and 200.

The number of electrodes of the piezoelectric sensors may be at least 6, where at least 3 electrodes are opposite to at least 3 other electrodes and the at least 3 pairs of electrodes are separated by a material with piezoelectric properties. Such an arrangement allows movements such as dragging of the finger to be sensed.

A number of electrodes of the piezoelectric sensors may be at least 10, where at least 5 electrodes are opposite to at least 5 other electrodes and the at least 5 pairs of electrodes are separated by a material with piezoelectric properties. Such an arrangement allows movements such as dragging of the finger to be sensed and allows error correction mechanisms to be implemented for more exact measurements.

The finger portion may be connected to a computing device, possibly via a wireless or wired connection.

In some cases, at least 50% of the electrodes of the piezoelectric sensors may be positioned within 3 cm, and possibly within 1.5 cm, from a fingertip, and may possibly be positioned on an underside of the finger portion.

The finger portion may include at least one gyroscope sensor. The finger portion may also include at least one accelerometer. The finger portion may also include at least one light sensor, possibly located on the underside of the finger portion.

Piezoelectric pressure sensors may include piezoelectric polymer and at least two electrodes, where the electrodes are positioned on an underside of the finger portion. The finger portion may have an elastic polymer wall which may be made of polyvinylidene fluoride. The electrodes for each sensor may be positioned opposite each other on both sides of the elastic polymer wall. The electrodes may each have a width in a range from 0.05 to 1 mm. The electrodes each may have a length in a range from 0.05 to 1 mm. The electrodes may each have a thickness in a range from 0.005 to 0.5 mm. The electrodes may be made of conductive polymer or metal. The metal may be chosen from the group consisting of titanium, gold, silver, platinum and copper.

Each electrode may be connected to a wire. The wire may have a thickness in a range from 0.01 to 0.5 mm. The wire may be made of conductive polymer or metal. The metal may be chosen from the group consisting of titanium, gold, silver, platinum and copper.

On the other end of the wires, the wires may be connected to a computing device, a wireless transmitter and/or a switching device. At least part of the wires may be bundled and optionally insulated. The wires may also be bundled using a heat shrink tube. The bundled wires may be surrounded by a magnetic shielding mechanism such as a copper net.

The elastic polymer wall may have a thickness in a range from 0.1 to 2 mm, and possibly in a range from 0.5 to 1.5 mm.

The electrodes on the surface of the polymer wall may be covered by a protective layer. The protective layer may be made of polymeric material. The protective layer may be present on an outer side of the finger portion to avoid abrasion of the electrodes by movement of the fingers over surfaces. The protective layer may be present on an inner side of the finger portion to prevent corrosion of the electrodes by aggressive liquids like sweat. The inner protective layer and the outer protective layer may be made of the same or of different materials. The material of the protective layers may be independently selected from the group consisting of nitrile rubber, latex, polyethylene, polypropylene or mixtures thereof.

The protective layer may also have electromagnetic shielding capability. The finger portion may include a net or grid made of metal, in which case the influence of a magnetic field stemming from, for example, an electromagnetic coil, is inhibited from influencing measurements of the piezoelectric sensor signals.

The protective layer may include several sublayers with different functionality. At least one sublayer may be a protective layer that protects against mechanical stress. At least one sublayer may be a protective layer against electromagnetic radiation. At least one sublayer may be an electrical insulating sublayer.

In an embodiment of the system described herein, a set of at least two finger portions are provided, where each includes at least one distance sensor to measure a distance to the other one of the finger portions or to any other finger portion according to the system described herein.

The distance sensor may be an electromagnetic coil, possibly positioned at an edge of a finger portion that is located opposite a fingertip. The finger portions may be adapted to be worn on a thumb and an index finger of one hand.

In an embodiment of the system described herein, a computing device is operated by having signals from the electrodes of the piezoelectric sensors of the finger portion or a set of devices be translated into a relative or absolute movement within a user interface of the computing device, possibly where the computing device is selected from a group that includes watches, computer operated glasses or eye-tracking computing devices.

The change in distance between the finger portions may be translated into a zoom effect within a user interface of the computing device.

BRIEF DESCRIPTION OF DRAWINGS

Embodiments of the system described herein will now be explained in more detail with reference to the figures of the drawings, which are briefly explained as follows.

DETAILED DESCRIPTION OF VARIOUS EMBODIMENTS

Figure 1:
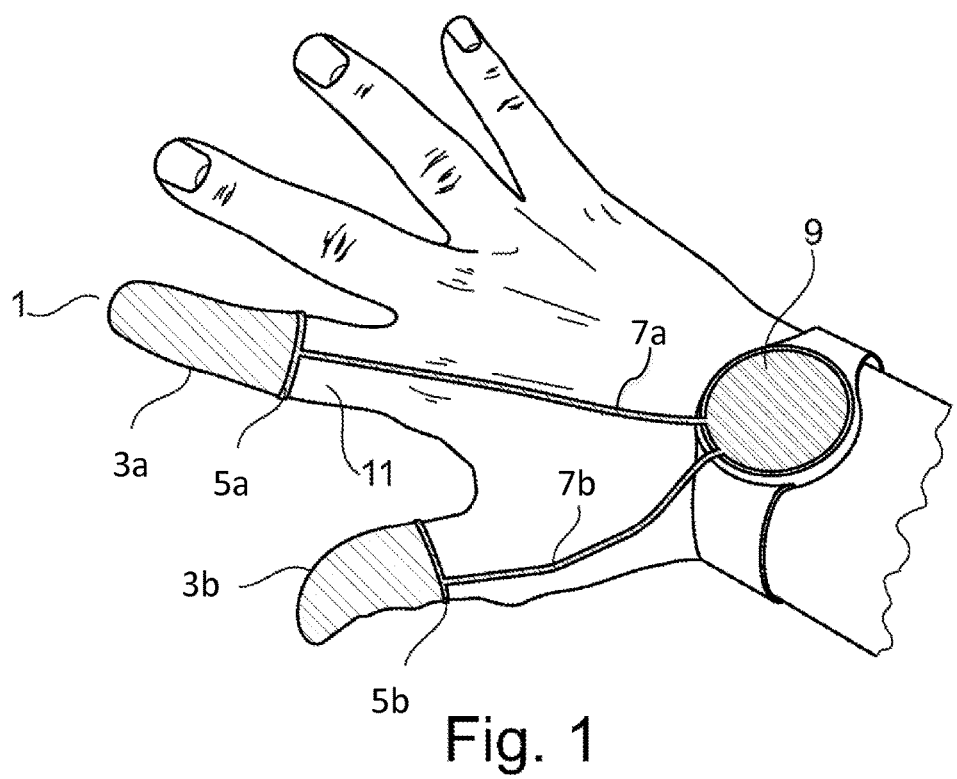
FIG. 1 shows a hand of a user who wears finger portions of a control device on a thumb and an index finger according to the system described herein.
Figures 2, 3:
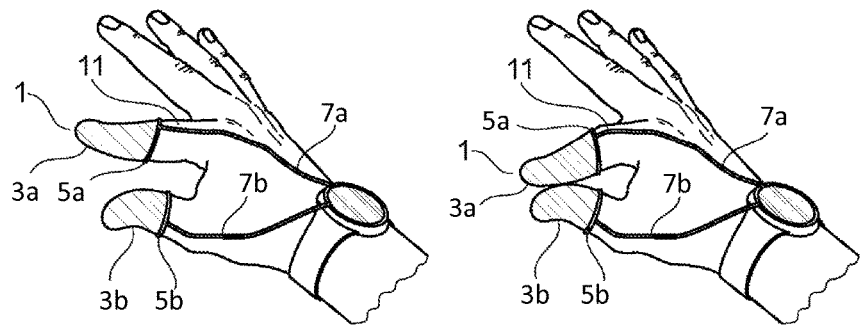
FIG. 2 shows a thumb and an index finger spaced apart, where both fingers include a finger portion of a control device according to the system described herein.
FIG. 3 shows a thumb and an index finger touching each other, where both fingers include a finger portion of a control device according to the system described herein.
Figure 4:
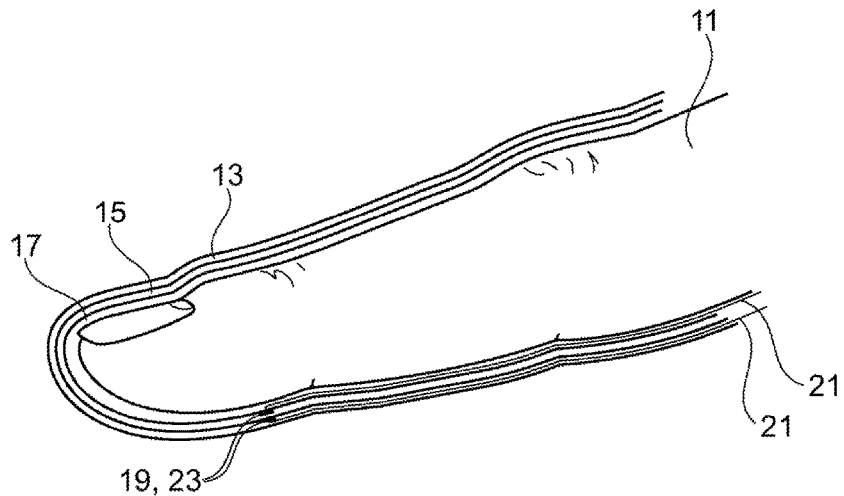
FIG. 4 shows an index finger and an inner protective layer, an outer protective layer and wires according to the system described herein.

A control device 1 may include finger portions 3a, 3b, each having a 1 mm thick polymer wall 15 made of amorphous polyvinylidene fluoride. The finger portions 3a, 3b may be thimble shaped. Square gold electrodes 19 measuring 1 mm×1 mm and having a thickness of 0.1 mm may be positioned on the polymer wall 15. Note that the electrodes 19 may be any appropriate shape. Wires 21 may be coupled to and lead away from the electrodes 19. The wires 21 may be made of gold and may have a diameter of 0.1 mm each. The electrodes 19 may be positioned opposite each other on both sides of the polymer wall 15, thus forming a piezoelectric sensor 23. In an embodiment herein, thirty sensors like the sensor 23 are formed on an underside of the finger portion 3b. The polymer wall 15 may be enclosed between an inner protective layer 17 and an outer protective layer 13, both made of nitrile rubber. The electrodes 19 may soldered to the wires 21.

The wires 21 may be insulated and bundled in one of a plurality of heat shrink tubes 7a, 7b and then connected to a computing device in the form of a watch 9. The heat shrink tubes 7a, 7b may include electromagnetic shielding using, for example, a copper net. Inside the watch 9, the wires 21 may be connected to piezoelectric transducers (not shown) to convert a potential measured by the electrodes 19 into signals that can be processed by the computing device 9. Based on the change in potential of neighbouring electrodes of the piezoelectric sensors, the computing device 9 may determine whether the finger 11 is just touching a surface or is being dragged over a surface.

The control device 1 may also include electromagnetic coils 5a, 5b, each in a ring-shaped housing situated at an end of the corresponding one of the finger portions 3a, 3b arranged around the finger 11 or the thumb. The electromagnetic coils 5a, 5b may be covered by the inner protective layer 17 and/or by the outer protective layer 13 and may be connected by the wires 21 to the computing device 9 in a manner similar to connecting the electrodes 19 of the piezoelectric sensor 23.

Signals emitted by the electromagnetic coils 5a, 5b may provide information about a distance between different fingers (e.g., the distance between the finger 11 and the thumb).

A ring housing the electromagnetic coils 5a, 5b may also house a gyroscope sensor and/or an accelerometer, which may be connected to the computing device 9 in a manner similar to connecting the electrodes 19 of the piezoelectric sensor 23. The gyroscope sensor and/or the accelerometer may provide more accurate information about movement and position of the fingers.

Various embodiments discussed herein may be combined with each other in appropriate combinations in connection with the system described herein. Various aspects of the system described herein may be implemented using hardware, software, a combination of hardware and software and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A finger operated control device, comprising:
   at least one finger portion having an elastic polymer wall with continuous piezoelectric properties throughout the finger portion that covers at least 30% of a surface area of skin around a distal phalanx of a finger; and
   at least six electrodes disposed opposing each other on both sides of the elastic polymer wall and covered by a protective layer, wherein each opposing pair of the electrodes and a portion of the elastic polymer wall therebetween form a separate piezoelectric sensor to directly detect a pressure acting on the separate piezoelectric sensor orthogonal to a surface of the separate piezoelectric sensor and orthogonal to the surface area of the skin, wherein the elastic polymer wall is shared by the at least six electrodes, and
   wherein the electrodes are positioned on an underside of the finger portion.

2. The control device according to claim 1, wherein the at least one finger portion is thimble shaped and made of polymer.

3. The control device according to claim 2, wherein the at least one finger portion is one of: a piezoelectric polymer and polyvinylidene fluoride.

4. The control device according to claim 1, wherein a distance between at least 50% of the electrodes is one of: between 0.1 and 5 mm and between 0.5 and 2 mm.

5. The control device according to claim 1, wherein a number of electrodes is between 20 and 200.

6. The control device according to claim 1, further comprising:
   a computing device, coupled to the finger portion using at least one of: a wireless connection and a wired connection.

7. The control device according to any one of claim 1, wherein at least 50% of the electrodes are positioned from a tip of the finger within at least one of: 3 cm and 1.5 cm.

8. The control device according to claim 1, wherein the finger portion also includes at least one of: a gyroscope sensor, an accelerometer, and a light sensor disposed on an underside of the finger portion.

9. The control device according to claim 1, wherein the electrodes are separated by a piezoelectric polymer.

10. The control device according to claim 1, wherein at least two finger portions provide a distance sensor to measure a distance between the at least two finger portions.

11. The control device according to claim 10, wherein the distance sensor is provided using electromagnetic coils.

12. The control device according to claim 11, wherein each of the electromagnetic coils is positioned at an edge of the finger portions located opposite a tip of the finger.

13. The control device according to claim 11, wherein the at least two finger portions are adapted to be worn on a thumb and an index finger of one hand.

14. The method according to claim 1, wherein at least two of the piezoelectric sensors formed by the pairs of electrodes enables detection of dragging of a finger over a surface.

15. The control device according to claim 1, wherein the protective layer includes electromagnetic shielding.

16. A method of operating a computing device, comprising:
   receiving signals from at least six electrodes of piezoelectric sensors coupled to at least one finger portion having an elastic polymer wall with continuous piezoelectric properties throughout the finger portion that covers at least 30% of a surface area of skin around a distal phalanx of a finger, the electrodes being disposed opposing each other on both sides of the elastic polymer wall and covered by a protective layer, wherein each opposing pair of the electrodes and a portion of the elastic polymer wall therebetween form a separate one of the piezoelectric sensors to directly detect a pressure acting on the separate one of the piezoelectric sensors orthogonal to a surface of the separate one of the piezoelectric sensors and orthogonal to the surface area of the skin;
   translating the signals into a relative or absolute movement within a user interface of the computing device, wherein the computing device is one of: a watch, computer operated glasses and an eye-tracking computing device, wherein the elastic polymer wall is shared by the at least six electrodes, and
   wherein the electrodes are positioned on an underside of the finger portion.

17. The method according to claim 16, wherein a change in distance between the finger portions is translated into a zoom effect within the user interface of the computing device.

18. The method of claim 16, further comprising:
   using electromagnetic shielding of the protective layer to inhibit influence of another electromagnetic source on the received signals.

19. A finger operated control device, comprising:
   at least one finger portion having an elastic polymer wall with continuous piezoelectric properties throughout the finger portion that covers at least 30% of a surface area of skin around a distal phalanx of a finger; and
   at least two opposing pairs of electrodes disposed opposing each other on both sides of the elastic polymer wall and covered by a protective layer, wherein each of the two or more opposing pairs of the electrodes and a respective portion of the elastic polymer wall therebetween form a separate piezoelectric sensor to directly detect a pressure acting against a surface of the separate piezoelectric sensor and orthogonal to the surface area of the skin, wherein each opposing pair of the electrodes are positioned only on an underside of the finger portion at a location corresponding to the distal phalanx of a finger, and wherein the elastic polymer wall is shared by the at least six electrodes.

20. The control device according to claim 19, wherein the at least one finger portion is thimble shaped and made of polymer.

21. The control device according to claim 19, wherein the finger portion also includes at least one of: a gyroscope sensor, an accelerometer, and a light sensor disposed on an underside of the finger portion.

22. The control device according to claim 19, wherein at least two finger portions provide a distance sensor to measure a distance between the at least two finger portions.

* * * * *